(12) United States Patent
Miller et al.

(10) Patent No.: US 7,996,228 B2
(45) Date of Patent: Aug. 9, 2011

(54) VOICE INITIATED NETWORK OPERATIONS

(75) Inventors: Quentin Miller, Sammamish, WA (US);
John J. Ostlund, Redmond, WA (US);
Anand Ramakrishna, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1204 days.

(21) Appl. No.: 11/275,324

(22) Filed: Dec. 22, 2005

(65) Prior Publication Data

US 2007/0150286 A1  Jun. 28, 2007

(51) Int. Cl.
*G10L 21/00* (2006.01)

(52) U.S. Cl. ............... 704/270.1; 704/260; 704/257; 704/275; 704/9; 379/88.19; 379/114.01; 379/88.14; 455/428; 455/429; 711/143

(58) Field of Classification Search .......... 704/201, 704/260, 235, 9, 257, 270, 270.1, 275; 379/88.01, 379/88.19, 440, 114.01, 114.02, 114.21, 379/88.14; 455/428, 429, 414.1; 711/143; 375/222; 707/100; 725/39

See application file for complete search history.

(56) References Cited

U.S. PATENT DOCUMENTS

| | | | |
|---|---|---|---|
| 5,870,454 A * | 2/1999 | Dahlen ................ | 379/88.14 |
| 6,510,412 B1 | 1/2003 | Sasai et al. | |
| 6,782,364 B2 * | 8/2004 | Horvitz ................ | 704/275 |
| 7,047,196 B2 * | 5/2006 | Calderone et al. ...... | 704/270.1 |
| 7,107,017 B2 * | 9/2006 | Koskelainen et al. .... | 455/90.2 |
| 7,197,502 B2 * | 3/2007 | Feinsmith ............. | 707/100 |
| 2003/0055652 A1 * | 3/2003 | Nichols et al. ........ | 704/275 |
| 2004/0176954 A1 * | 9/2004 | Wang ................. | 704/254 |
| 2004/0224710 A1 * | 11/2004 | Koskelainen et al. ... | 455/518 |
| 2005/0149333 A1 * | 7/2005 | Thalanany et al. ..... | 704/275 |
| 2005/0203998 A1 * | 9/2005 | Kinnunen et al. ...... | 709/204 |
| 2006/0053010 A1 * | 3/2006 | Chapman et al. ....... | 704/235 |
| 2006/0075429 A1 * | 4/2006 | Istvan et al. ......... | 725/39 |
| 2006/0136224 A1 * | 6/2006 | Eaton et al. .......... | 704/277 |
| 2006/0167676 A1 * | 7/2006 | Plumb ................ | 704/6 |
| 2006/0182236 A1 * | 8/2006 | Kapoor ............... | 379/88.14 |
| 2007/0050191 A1 * | 3/2007 | Weider et al. ......... | 704/275 |
| 2007/0112571 A1 * | 5/2007 | Thirugnana ........... | 704/270 |
| 2007/0136475 A1 * | 6/2007 | Leppisaari et al. ..... | 709/227 |
| 2008/0214151 A1 * | 9/2008 | Ramer et al. .......... | 455/414.1 |

FOREIGN PATENT DOCUMENTS

| | | |
|---|---|---|
| CN | 1390347 A | 1/2003 |
| EP | 1031964 A2 | 8/2000 |
| EP | 1455268 A2 * | 9/2004 |
| WO | WO9844708 A1 * | 10/1998 |

OTHER PUBLICATIONS

PCT Search Report for PCT Application No. PCT/US2006/044920, mailed Apr. 16, 2007 (12 pages).

The Chinese Office Action mailed on Jul. 10, 2009 for Chinese Patent Application 200680048127.4, a counterpart foreign application of US Patent Publication US 2007-0150286-A1, 10 pages.

(Continued)

*Primary Examiner* — Vijay B Chawan

(74) *Attorney, Agent, or Firm* — Lee & Hayes, PLLC

(57) ABSTRACT

Embodiments of voice initiated network operations are presented herein. Voice initiation of operations is described which may be utilized to assist a user in performing operations, such as when other input mechanisms are undesirable, inconvenient, or impossible. A user provides speech to a client device. The speech is converted to text. The text is used to perform operations and obtain results.

12 Claims, 7 Drawing Sheets

OTHER PUBLICATIONS

The Chinese Office Action mailed on Nov. 1, 2010 for Chinese Patent Application 200680048127.4, a counterpart foreign application of US Patent Publication US 2007-0150286-A1, 17 pages Extended EP Search Report dated Apr. 6, 2010, for EP Application 06844440.5, a counterpart foreign application for US Publication US-2007-0150286-A1, 5 pages.

PCT Search Report dated Apr. 16, 2007 for PCT patent application PCT/US2006/044920, a counterpart PCT applcation for US Publication US 2007-0150286 A1, 3 pages.

PCT Written Opinion mailed Apr. 16, 2007 for PCT Application PCT/US2006/04920, a counterpart application to US Publication US-2007-0150286-A1, 6 pages.

* cited by examiner

VOICE INITIATED NETWORK OPERATIONS

BACKGROUND

Portable electronic devices such as laptop computers, wireless phones, personal digital assistants, wireless devices, gaming systems, and audio players have become increasingly popular. Users may use one or more of these devices for various activities such as to communicate, one to another, through the use of email, instant messaging, and so forth. Further, users may use one or more of these devices to access a variety of content via a network. However, the compact size of portable electronic devices may hinder user activities.

For instance, compact portable electronic devices are not well suited to text entry. Additionally, it may be difficult, unsafe, and/or inconvenient to input information into portable electronic devices while "on the go", such as while driving or traveling.

SUMMARY

Voice initiation of operations is described which may be utilized to assist a user in performing operations, such as when other input mechanisms are undesirable, inconvenient, or impossible. A user provides speech to a client device. The speech is converted to text. The text is used to perform operations and obtain results. A response is formed to communicate the results of the operation to the client device. The response may be formatted in a variety of ways, such as incorporating text as well as non-textual portions (e.g., graphical, audio, and so on). For example, a search operation performed by a search engine may be initiated by user speech. The results of the search are provided to the user. The user may then initiate further operations with additional speech using the search results.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

In some circumstances, manual input (e.g., by hand) into a computing device, handheld or mobile device may be inconvenient, unsafe, or impossible. In a variety of implementations, techniques are described which may be utilized to initiate operations via speech such as spoken commands or terms.

A user, for instance, may provide speech to a client device such as a mobile phone, computing device, portable digital assistant (PDA), and so forth. The speech is then converted into text. Converted text may then be used by a service to perform one or more operations based on the converted text. A variety of operations are contemplated.

For instance, the text may be used as search terms provided to an internet search engine to perform a search. The results of the operations are obtained. A response is formed which contains the results, which is then provided to the client device for the user. The response may be provided in a variety of ways, such as through email, hyper text markup language (HTML), instant message, audible and so forth. For example, a user may be provided with an HTML document having a map and a list of restaurants in response to a spoken request for the nearest restaurant. In an implementation, the operation may be automatically refined by the location of the client device. Thus, a search for restaurants may automatically return the five closest restaurants, based upon the location of the client device.

In the following discussion, an exemplary environment is first described which is operable to employ techniques to provide speech initiated operations Exemplary procedures and user interfaces are then described which are operable in the exemplary environment to provide the speech initiated operations techniques, as well as in other environments.

Exemplary Environment

Figure 1:
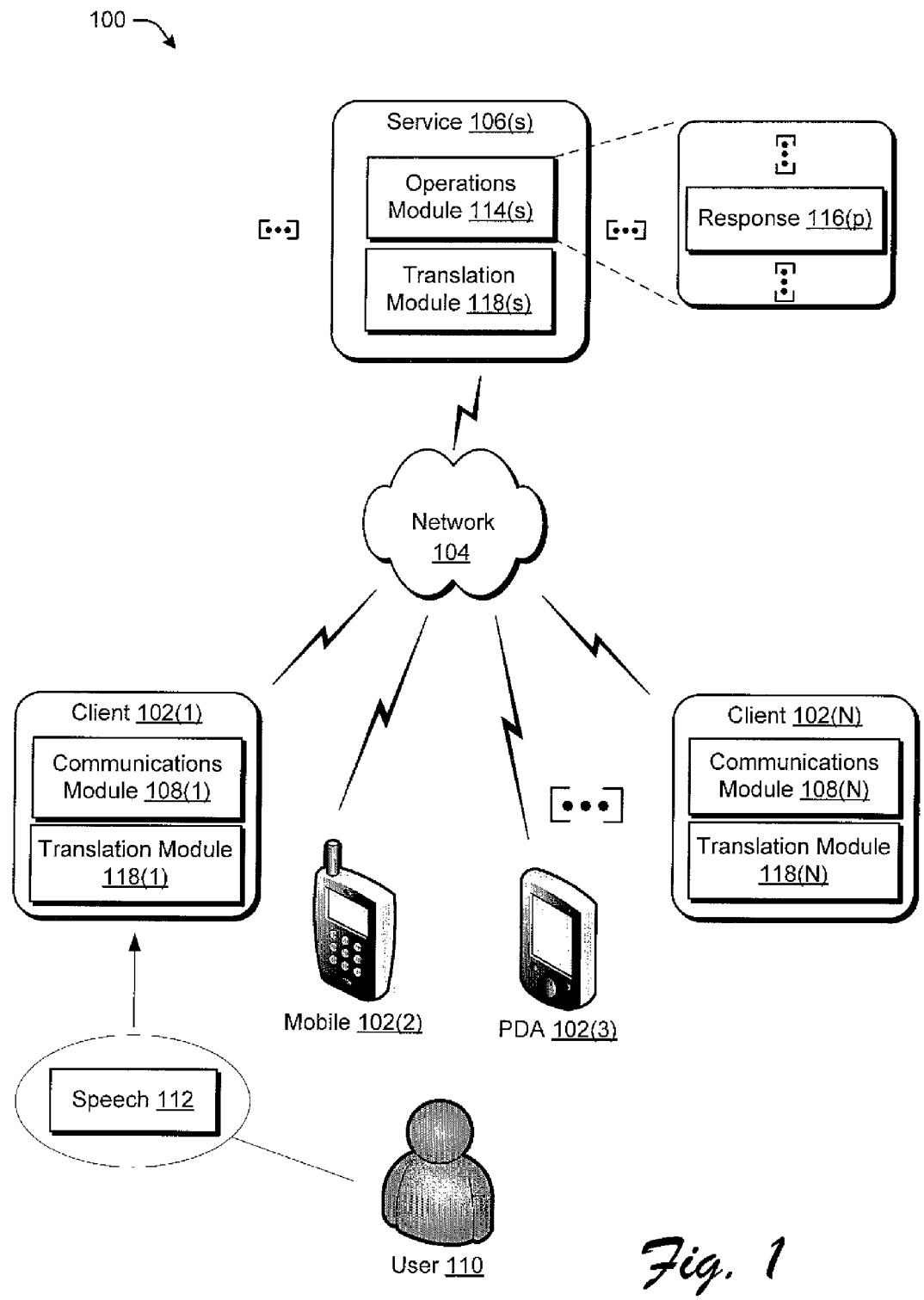
FIG. 1 is an illustration of an environment in an exemplary implementation that is operable to employ voice initiated operation techniques.

FIG. 1 is an illustration of an environment 100 in an exemplary implementation that is operable to employ voice initiated operation techniques. The environment 100 is illustrated as including a plurality of clients 102(1), 102(2), 102(3), . . . 102(N) that are communicatively coupled to a network 104. The plurality of clients 102(1) to 102(N) in the following discussion may also be referred to as clients 102(n) (where "n" can be any integer from one to "N"). The plurality of clients 102(n) may be configured in a variety of ways. For example, one or more of the clients 102(n) may be configured as a computer that is capable of communicating over the network 104, such as a desktop computer, a mobile station, a game console, an entertainment appliance, a set-top box communicatively coupled to a display device, a wireless phone, and so forth. Clients 102(n) may also be portable electronic devices such as laptops, mobile phones 102(2), personal digital assistance (PDA) 102(3), audio players and so forth. Clients 102(n) may be configured to access a network 104 via a wireless connection, a wired connection and so on. The clients 102(n) may range from full resource devices with substantial memory and processor resources (e.g., personal computers, television recorders equipped with hard disk, game consoles) to low-resource devices with limited memory and/or processing resources (e.g., traditional set-top boxes). In the following discussion, the clients 102(n) may also relate to a person and/or entity that operate the client. In other words, the clients 102(n) may describe a logical client that includes a user and/or a machine.

Additionally, although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks. For instance, a plurality of clients 102(n) may be coupled via a wireless network to communicate, one to another. Each of these clients may also be communicatively coupled to one or more of a plurality of service 106(s) depicted in FIG. 1 (where "s" can be any integer form one to "S") over the Internet. A variety of other examples are also contemplated.

As depicted in FIG. 1, the plurality of services 106(s) may be accessible to clients 102(n) via network 104. Service 106(s) may be configured in a variety of ways. Services 106(s) generally provide resources (e.g., services and content) to clients 102(n) via network 104. The resources may be configured as a variety of content, such as web pages, music, video, images, user forums, templates, add-ins, web logs (blogs), and so forth. Further, services 106(s) may provide resources which are services, such as instant messaging service, email service, search service, online shopping, financial service and so forth. A client may access a service 106(s) to initiate a variety of activities such as communications, searching, account access, file management, consumer activities and so on.

Each of the plurality of clients 102(n) is illustrated as including a respective one of a plurality of communication modules 108(n). In the illustrated implementation, each of the plurality of communication modules 108(n) is executable on a respective one of the plurality of clients 102(n) to provide communication modes between a plurality of clients 102(n), between a client 102 and one or more services 106(s), and so on. Thus, a communication module 108(n) represents functionality provided to a client 102(n) to send and receive information, voice data, messages, and so on over the network 104.

For example, one or more of the communication modules 108(n) may be configured to send and receive email. Email employs standards and conventions for addressing and routing such that the email may be delivered across the network 104 utilizing a plurality of devices, such as routers, other computing devices (e.g., email servers), and so on. In this way, emails may be transferred within a company over an intranet, across the world using the Internet, and so on. An email, for instance, may include a header and a user-specified payload, such as text and attachments, e.g., documents, computer-executable files, and so on. The header contains technical information about the source and oftentimes may describe the route the message took from sender to recipient.

Communication module 108(n) may also be configured to provide cellular or wireless voice service. Wireless voice service provides a mechanism for communicating voice data between a plurality of clients 102(n) and/or a client 102(n) and a service 106(s). For instance, a client 102(n) may communicate voice data to another client in real-time, or near real-time. Thus, a plurality of clients 102(n) may engage in a conversation, via a wireless network. A client 102(n) may also communicate voice data to one or more of services 106(s).

Further, a communication module 108(n) may be configured to provide push-to-talk over cellular (PoC) functionality. PoC is a two-way form of communication that permits near-immediate communication between one or more clients 102(n) and/or services 106. A communication module 108(n) may provide a list of a PoC contacts or groups which may be selected to initiate a PoC session. A client 102(n) may be configured with a PoC button, which may be depressed to talk during the PoC session. Through the PoC session, the receiving contact or group may hear the sender's voice without any action on their part. Thus, PoC is similar to using a "walkie-talkie" or intercom. PoC may be implemented via a wireless voice network, a peer-to-peer network, via the Internet, and so forth. Although the name indicates "cellular", PoC may be utilized on clients 102(n) configured in variety of ways including mobile phones, laptops, handheld devices, desktop computing devices, and so forth. For instance, a PoC session may be established between a desktop computing device and a service 106(n) via the Internet.

In another example, one or more of the communication modules 108(n) may be configured to send and receive instant messages. Instant messaging provides a mechanism such that each of the clients 102(n), when participating in an instant messaging session, may send text messages to each other. Instant messaging may also provide voice instant messaging functionality, such that voice data may be exchanged via the instant messaging session. The instant messages are typically communicated in real time, although delayed delivery may also be utilized, such as by logging the text messages when one of the clients 102(n) is unavailable, e.g., offline. Thus, instant messaging may be though of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received.

Although PoC, wireless voice service, instant messages and emails have been described, communications modes may assume a variety of other configurations without departing from the spirit and scope thereof. Further, an individual client 102(n) (and more particularly a communications module of the client 102(n)) may be configured to provide a variety of different combinations of communication modes, such as providing both instant messaging and wireless voice.

A communication module 108(n) may further provide functionality to receive spoken commands and to communicate with a service 106(s). FIG. 1 depicts a user 110 representative of a variety of users who may use one or more of the plurality of clients 102(n). User 110 is depicted as providing speech 112 to a client 102(1). Speech 112 represents the spoken words of a user, such as user 110 which may specify operations to be performed by a service 106(s). Speech 112 is received by client 102(1) and may be communicated by communication module 108(1) via to service 106(s) via network 104. As will be described in detail below, speech 112 may be communicated to a service 106 as voice data or as converted voice data (e.g., text).

Each of the services 106(s) includes, respectively, one or more operations module 114(s). Operation modules 114(s) are representative of functionality which is executable to perform one or more operations specified by speech 112 of a user 110. Thus, speech 112 may be used to initiate the operations by an operation module 114(s). Operations module 114(s) also represents functionality to format a response 116 (p) which contains the results of the operations specified by speech 112. Operations modules 114(s) may be configured to provide a variety of operations. Operations which may be performed by an operations module 114(s) include but are not limited to, searching, purchasing items, making service reservations (e.g. at a restaurant, salon, auto mechanic, and so on) making travel reservations, accessing an account, accessing content, retrieving stored content, downloading items, and so forth.

In an implementation, operation module 114(s) may be configured to provide a response 116(p) to a client 102(n) which includes the results of the operations performed by operation module 114(s). A response 116(p) may be configured in a variety of ways, such as including a variety of textual and/or non-textual portions (e.g., graphical messages, audio messages, and so on). Further discussion of various responses 116(p) may be found in relation to FIG. 2.

In an implementation, a service 106(s) may receive speech 112 as voice data. In some instances, however, the operations module 114(s) may not understand the voice data to perform the specified operations. Accordingly, a translation may be performed. For instance, each service 106(s) is depicted having a respective translation module 118(s). Translation module 118(s) represents functionality to translate between voice data and text commands to be understandable by a module configured to perform desired operations, such as operations module 114(s) of the service 106(s). For instance, speech 112 received as voice data may be converted by translation module 118(s) into text understandable by the operations module 114(s). Operation module 114(s) may then use the converted speech (e.g., text) to perform operations specified by the speech 112. In an implementation, translation module 118(s) may also be configured to convert a response 116(p) to voice data for communication to a client 102(n).

Although execution of the translation module 118(s) on a service 106(s) has been described, the clients 102(n) may also employ similar functionality. For instance, FIG. 1 depicts each client 102(1)-102(N) as having a respective translation module 118(1)-118(N). In an implementation, speech 112 received by a client 102(n) may be translated into text at the client. The service 106(s) and in particular the operations module 114(s) then receives text understandable to the operations module 114(s), which specifies operations to be performed. Also, a non-audible response 116(p) or portion thereof provided to a client 102(n) may be translated to speech by the client 102(n). Further discussion of voice data translation via translation modules 118 may be found in relation to FIG. 2.

In an implementation, a single service 106(s) may perform numerous operations. For instance, a user 110 may provide speech 112 which results in a service 106(s) performing a search for available content, such as web pages, video, audio and so on. User 110 may have previously subscribed to or purchased the content, or may wish to purchase the content. The content may also be items maintained by the user, such as in storage accessible to a client 102(n) via network 104. The search generates search results listing available content which are provided to the client 102(n). The user 110 may then view the available content and provide additional speech 112 to initiate additional operations such as streaming a content item included in the search results to the client, downloading the content, purchasing the content and so forth.

Alternatively, a plurality of services 106(s) may be used in combination to perform numerous operations. Thus, additional operations may be performed by the same service 106, or another service 106(s). In another example, the user 110 may use speech 112 to initiate a search for travel options, such as available airline flights, using one of the plurality of services 106(s). Then, having received search results, the user 110 may use additional speech to initiate an operation to reserve a particular flight indicated in the search results via another of the plurality of services 106(s). Further discussion of operation performance in response to speech may be found in relation to FIGS. 3-7.

Generally, any of the functions described herein can be implemented using software, firmware (e.g., fixed logic circuitry), manual processing, or a combination of these implementations. The terms "module" and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the speech techniques described below are platform-independent, meaning that the techniques may be implemented on a variety of commercial computing platforms having a variety of processors.

Figure 2:
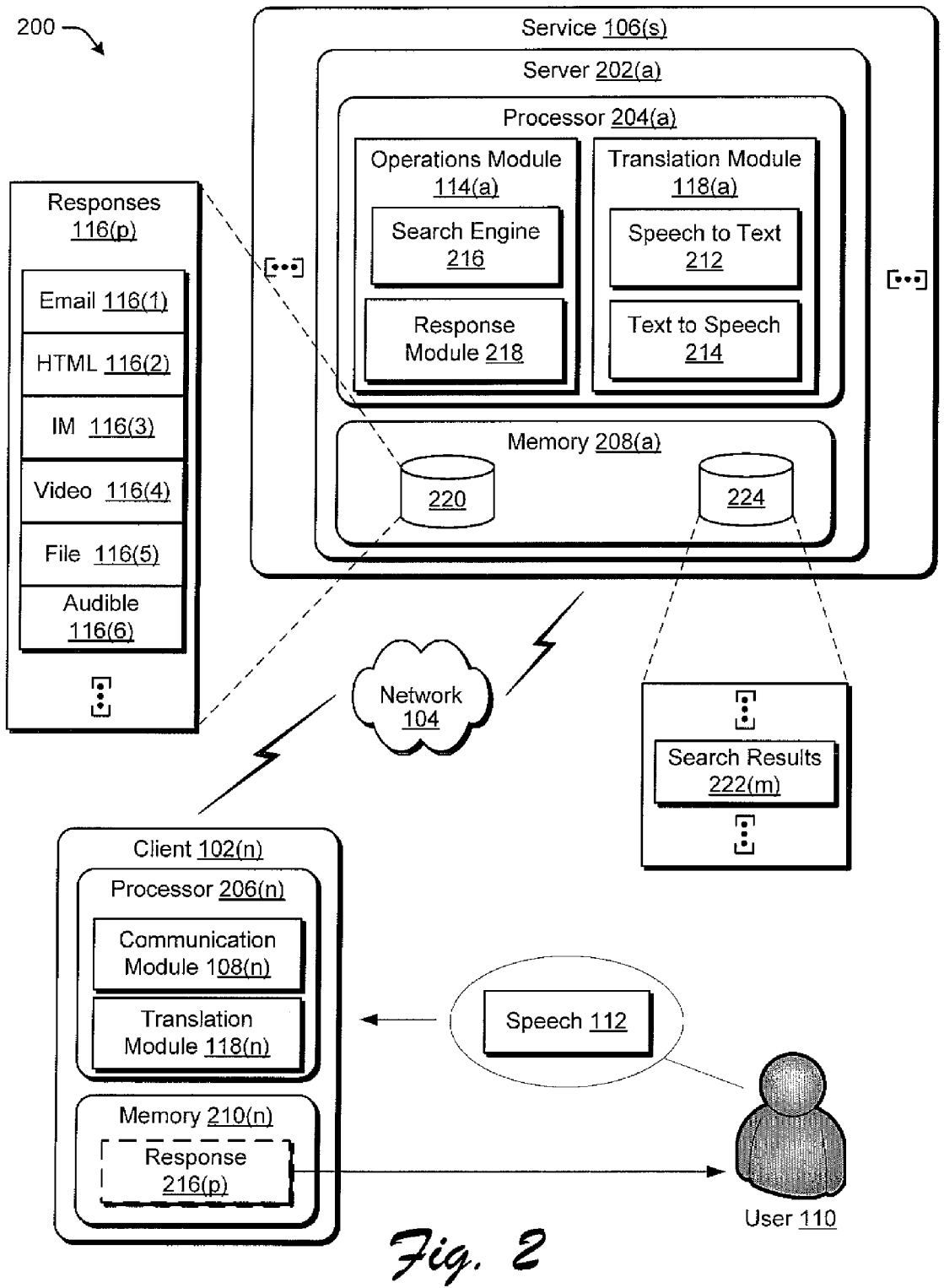
FIG. 2 is an illustration of a system in an exemplary implementation showing exemplary clients and a service of FIG. 1 in greater detail.

FIG. 2 is an illustration of a system 200 in an exemplary implementation showing an exemplary client 102(n) and a service 106(s) of FIG. 1 in greater detail. The service 106(s) is illustrated as being implemented by a plurality of servers 202(a) (where "a" can be any integer from one to "A") and the client 102(n) is illustrated as a client device. The servers 202(a) and the client 102(n) are each illustrated as having a respective processor 204(a), 206(n) and a respective memory 208(a), 210(n).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(a), 210(n) is shown, respectively, for the servers 202(a) and the client 102(n), a wide variety of types and combinations of memory may be employed, such as random access memory (RAM), hard disk memory, removable medium memory, and so forth.

Operation modules 114(a) and translation module 118(a) are depicted as executed on processor 204(a) of server 202(a). Naturally, operation module 114(a) and translation module 118(a) may also be provided on different respective servers 202 within the same service 106(s), or within different ones of a plurality of services 106 depicted in FIG. 1. It is noted that the functionality associated with various modules described herein may be further combined or divided without departing from the spirit and scope thereof. For example, although operation modules 114(a) and translation module 118(a) are depicted separately, the functionality of each may be provided in a single module.

Translation module 118(a) is further depicted having a speech to text module 212 and a text to speech module 214. Speech to text module 212, represents functionality that translates speech 112 provided by a client 102(2) as speech data, into text which may be used by operation module 114(a) to perform operations. Text to speech module 214 represents functionality which may translate the results of operations (e.g., a response 116(p) or portion thereof) into to voice data (e.g., audible sound). Text to speech module 214 may be configured to communicate real-time audible results to client 102(n). Alternatively, text to speech module 214 may generate audible results to be saved as an audio recording such as a voicemail, audio file or so forth which is made accessible to client 102(n).

In an implementation, one or more services 102(s) may provide voice initiated search operations. Operations module 114(a) as depicted in FIG. 2 is configured to provide search operations. A search engine 216 is depicted as executing on processor 204(a) within operation module 114(a), and is storable in memory 208(a). The search engine 216 may be used to perform a variety of searches. These include but are not limited to general web or internet, personal desktop, video, audio, enterprise, photo and/or local searches. The searches may be based upon keywords provided as speech by user 110 to client 102(n). Alternatively, speech 112 of user 110 may identify a stored search which provides search terms to the search engine 216. Naturally, search operations may be combined with other operations within a single operations module 114(a). In other words, an operations module 114(a) configured to provide searches may not be limited to providing searches.

In an implementation, operations module 114(a) includes a response module 218. Response module 218 represents functionality to form a response 116(p) which includes the results of operations performed by service 106(s). A response 116(p) is configured to be communicated to client 102(n) via network 104. Alternatively, the result may be stored remotely and accessible to client 102(n), or a user 110 via the client 102(n) or another device. Of course, results in a response 116(p) may be from a single operation module 114(a), multiple operations of a single service 106(s), an aggregation of numerous operations performed by a plurality of services 106(s) in combination, and so on.

Responses 116(p) may be configured in a variety of ways. A variety of responses 116(p) are depicted in storage 220 within memory 208(a) of server 202(a). Response 116(p) may be graphical responses which combine text and graphics. Thus in response to an audible input (e.g., speech 112) user 110 via client 102(n) may receive a response 116(p) in another format, e.g. not an audible response. Alternatively, the user 110 may receive a response that combines audible portions with textual and graphical portions. Thus, responses 116(p) may include combinations of text, graphics, video, audio and so on.

For example as depicted in FIG. 2, a response 116(p) may be configured as an email 116(1), and HTML document 116(2), an instant message 116(3), a video response 116(4), a computer readable file 116(5) and so on. Further, various responses 116(p) may be used alone or in combination with one another. For instance, an email and an instant message 116(3) could both be returned to a client 102(2). Also, an instant message 116(3) could be formed having an attached word processing file or other computer readable file 116(5). A variety of other combinations are also contemplated.

Likewise, audible responses 116(6) are depicted in FIG. 2 which may be used alone, or in conjunction with other responses 116(p). Audible response 116(6) represents a response or portion of a response that will be provided to client 102(n) to be "heard" by the client, e.g., as speech. For instance, an HTML document 116(2) may be generated in response to a search initiated by speech 112. The HTML response 116(2) is sent to client 102(n). In addition, the text to speech module 214 may convert the HTML 116(2) or portions thereof to audible speech and return an audible response 116(6). The audible response may be returned in real-time or near-real time, for instance, as the HTML document is converted by text to speech module 214. Thus, in response to an audible input (e.g., speech 112) user 110 via client 102(n) may receive a response 116(p) which is entirely or partially an audible response 116(6). It is noted that translation may alternatively occur at a client 102(n). Thus, client 102(n) is depicted having a respective translation module 116(n) which may be configured to perform both text to speech and speech to text conversion.

In the case of a search performed by search engine 216, the response 116 may include search results 222. A plurality of search results 222(m) are depicted in storage 224 within memory 208(a) of server 202(a). Search results 222(m) may be obtained by execution of search engine 216.

Operations module 114(a) may be configured to refine search results 222(m) in a variety of ways. Operations module 114(a) may use information regarding a client 102(n) or a user 110 to refines searches automatically. The information may include the location of the client 102(n), a profile of user 110, a search history associated with the user 110, a user 110 preferences or favorites and so on. The information may be provided to the operations module by the client device 102(n). Alternatively, a service 106(s) may maintain the information or retrieve the information such as from a client 102(n), from one of a plurality of servers 202(a) of the service 106(s), or from another service.

For instance, search results 222(m) may be filtered based on the location of the requesting client 102(n). Accordingly operations module 114(a) may be configured to determine the location of a client 102(n) requesting a search. For instance, the client location may be determined by an identifier provided in communications between the client 102(n) and the service 106(s). The identifier may be an identifier associated with the client device 102(n), with equipment routing the communication, and so on. In an example, the operation module 114(a) may use an identifier to determine that a client 102(n) is located in "Chicago". Thus, search results 222(m) in response to searches for restaurants, hotels, directions and so on, may automatically be limited to "Chicago". A variety of other techniques for determining location may also be employed.

Exemplary Procedures

The following discussion describes voice initiated operations that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2

Figure 3:
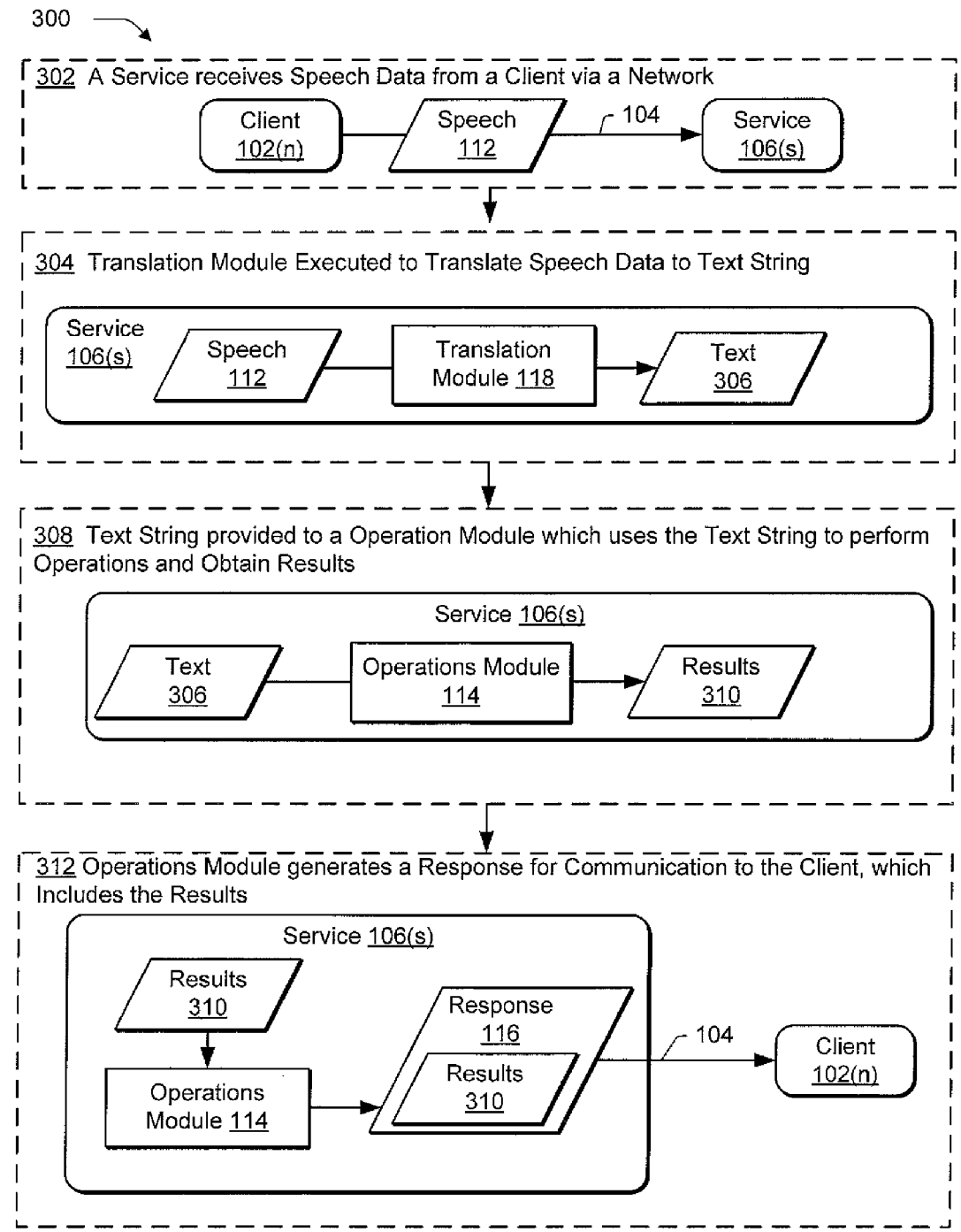
FIG. 3 is a flow diagram depicting a procedure in an exemplary implementation in which voice initiated operations are performed and a response generated.

FIG. 3 depicts a procedure 300 in which a service executes operations based upon speech data from a client, and generates a response. A service receives speech data from a client via a network (block 302). For example, a service 106(s) depicted in FIG. 1 may receive voice data which is input as speech 112 to client 102(1). Client 102(1) may be configured as a mobile computing device such as a wirelessly enabled laptop connected to network 104. A respective communication module 108(1) of client 102(2) may be executed to provide a voice instant messaging session between the client 102(2) and service 106(1). Thus, speech 112 may be transmitted by client 102(2) over network 104 via the voice instant messaging session and service 106(s) may receive (e.g. "hear") the speech 112.

Translation module 118(s) is executed to translate speech data to a text string (block 304). For instance, speech 112 received in the above example may be translated into text 306. Translation module 118(s) depicted in FIG. 1 may be executed to convert speech 112. The speech 112 may specify simple commands such as "1", "FOOD", "RUN", "BUY" and so forth, or speech 112 may be phrases or sentences for instance "Find Italian Restaurants". Thus, translation module 118(s) translates speech 112 to text 306 in the form of instructions, commands, terms and so on which may be utilized by a service 106(s) to initiate one or more operations.

Text is provided to an operations module which uses the text to perform operations and obtain results (block 308). Continuing the example, assume now that text 306 is a command, for instance "Buy Item 2". Operations module 114(s) of FIG. 1 receives the text 306. Operations module 114(s) may be configured to use text 306 to perform a purchasing operation. For instance, service 106(s) may have previously provided user 110 with a list of items for sale during the voice instant messaging session, via email, the internet or so forth. User 110 after reviewing the list decides to buy item 2 on the list. User 110 via client 102(1) (e.g. wireless laptop) provides the phrase "Buy Item 2" as speech to client 102(1) to initiate purchase of the desired item.

Operations module 114(s) receives the translated command as text 306 and initiates purchase operations. The results of the operation 310 are obtained. For instance, result in this example may be a completed transaction, a receipt, a prompt for purchasing information and so on. It should be noted that the operations module may initiate a purchase sequence which may be performed by the service 106(s) or any one or more of services 106(s) depicted in FIG. 1. Thus, a service 106(s) may be configured to handle an entire operation, or to initiate the operation which may be performed remotely (e.g., not within the particular service 106(s)) and obtain results. Naturally, a variety of operations as previously described may performed in response to speech 112.

Operations module generates a response for communications to the client, which includes the results (block 312). In the above example, operation module 114(s) forms a response 116(p) which includes the results 310 of the purchase operation, e.g. the "Buy Item 2" command. Results 310 for instance may be a purchase confirmation. A text instant message may be formed, which includes the confirmation. The instant message including the confirmation may be communicated via the instant messaging session between client 102(1) and service 106(s). Thus, in response to a voice purchase command, user 110 receives a text instant message response that confirms the purchase of the desired item. The ability to have different modes of input and response may be desirable in instances in which it is more difficult to form a textual or graphic request on certain client devices, or at certain times than it is to read a textual or graphic response. Thus, the ability to enter requests verbally and receive responses in different or multiple modes (e.g., text, graphics, audio and so forth) may be advantageous to certain users in certain instances.

In another example, the operations module may form an audible response. For instance, the text instant message with purchase confirmation may be converted via a translation module 118(s) from text to speech. The translated confirmation may be communicated in real time, for instance via the voice instant messaging session, such that user 110 is provided with an audible confirmation of the purchase. The translated response may be synthesized speech, recorded speech, and so on. This audible response may be provided in addition to or in lieu or another response. As previously described, at certain times audible responses may be more convenient or safer for users, such as while "on the go", driving, and so on.

In another instance, a graphical response such as the text instant message with purchase confirmation may be provided along with a simple audible response. For instance, a brief audible response such as "Completed", "Successful", "Result Sent" or "Try Again" may be provided. Translation module 118(s) may be configured to form the brief audible response.

In this instance, the user 110 is provided with both an audible and textual confirmation of the desired purchase. A variety of other combinations of response modes are also contemplated, which may include one or more of an e-mail, an instant message, an image, video, audio, files, HTML documents and so forth.

Figure 4:
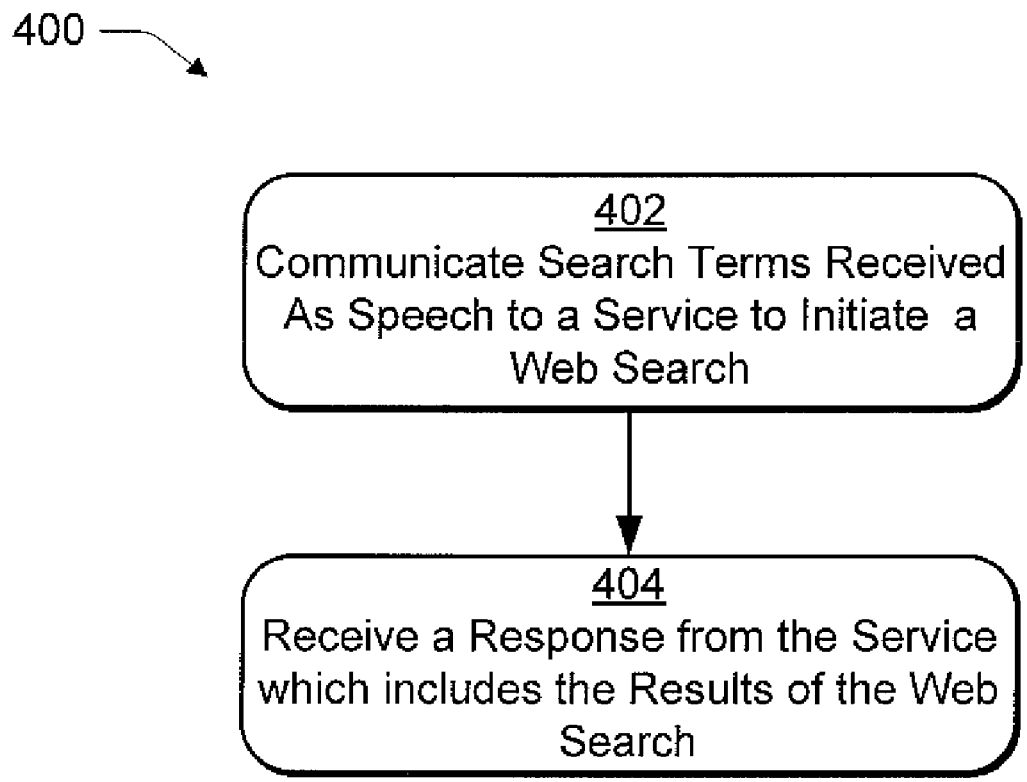
FIG. 4 is a flow diagram depicting a procedure in an exemplary implementation in which a web search is initiated by speech.

FIG. 4 depicts an exemplary procedure 400 in which speech is used to initiate a search at a service. Search terms received as speech are communicated to a service to initiate a web search (block 402). For instance, a user 110 depicted in FIG. 2 may initiate a search via client device 102(n) configured as a mobile phone. Accordingly, communications module 108(n) may be configured to provide wireless voice service via network 104 and thus client 102(n) may communicate voice data to one or more service 106(s). In this example, a user 110 of client device 102(n), configured as a mobile phone, is traveling in Chicago, Ill. and desires to eat Italian food. The user 110 may use the mobile phone to place a call to service 106(s) of FIG. 2, e.g., which is configured to provide search services. User 110 initiates interaction with the service, such as by dialing a number, selecting the service 106(s) from a list of contacts, and so on (e.g., voice activated dialing).

A wireless voice call is thus initiated between the service 106(s) and the client device 102(n). The user 110 provides speech 112 to the client device 102(n) (the mobile phone) to initiate a search. Speech 112 may include search terms such as "Italian Restaurants Chicago". The client device 102(n) communicates the search terms (e.g., speech 112) to the service 106(s). The speech 112 may be translated into text. Service 106(s) may then provide the text terms to a search engine 216 to initiate a web search.

A response is received from the service which includes the results of the web search (block 404). In the last example, for instance, service 106(s) may obtain a list of Italian restaurants as the result of the web search initiated by the spoken terms "Italian Restaurants Chicago". Service 106(s) and more particularly response module 218 forms a response 116(p) which includes the list of Italian Restaurants. The response may be a simple list, such as an email listing of the restaurants. The response might also have a combination of text and graphics (e.g., a graphical response) such as an HTML document with a list of restaurants, a map of Chicago, and an indication on the map where the listed restaurants are located. Client 102(2) receives the response from service 106(s) which may then be used by user 110. A variety of other responses 116(p) combining text, graphics, audio and so forth are also contemplated.

In an implementation, service 106(s) may be configured to refine the search or search results in a variety of ways. The service 106(s) in the previous example may use a location of the client 102(n) determined by the service 106(s) to automatically refine the search. The service 106(s), for instance, may determine that the wireless voice call originated in Chicago, or that the client device 102(n) is currently in Chicago. In this instance, the speech 112 to initiate the search may be simplified. The user 110, rather than saying "Italian Restaurants Chicago", may say "Italian Restaurants". The search is automatically refined based on the client location determined by the service 106(s). Thus, in response to search terms "Italian Restaurants" input as speech to client device 102(n), the user may receive search results for Italian restaurants at or near their current location, Chicago in this example.

Figure 5:
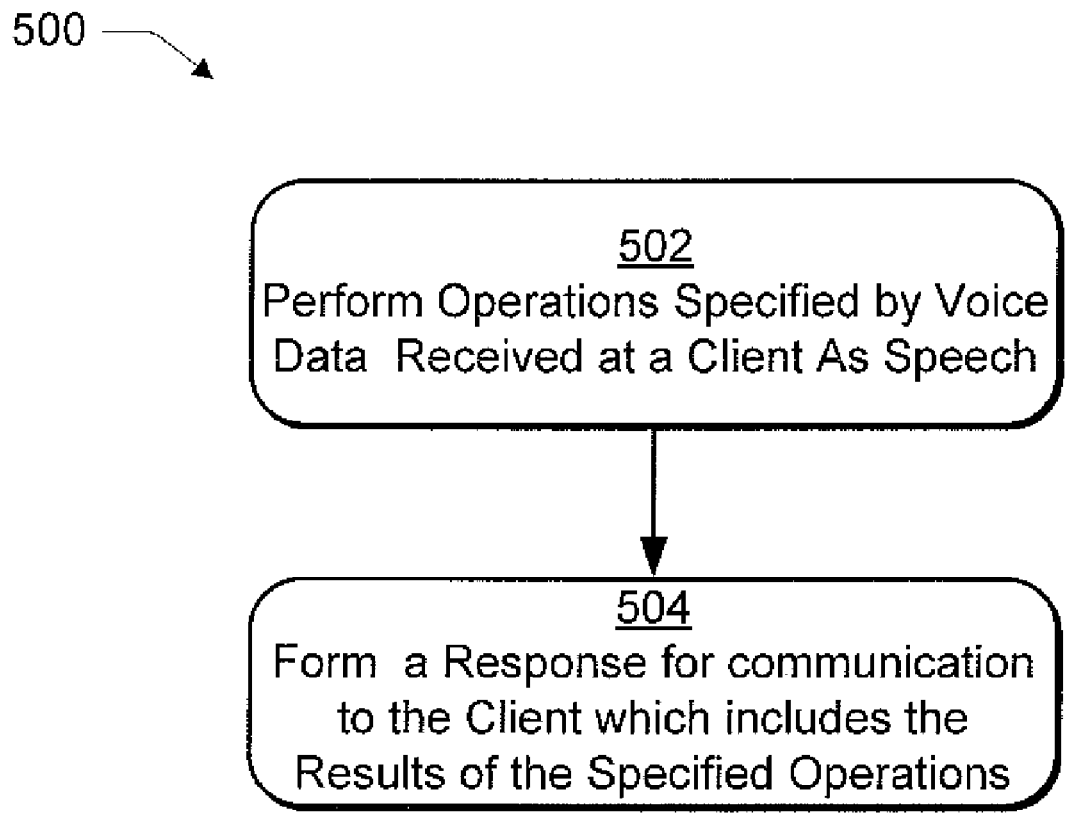
FIG. 5 is a flow diagram depicting a procedure in another exemplary implementation in which voice initiated operations are performed and a response generated.

FIG. 5 depicts an exemplary procedure 500 in which a response is formed including the results of an operation initiated by voice. Operations specified by voice data received at a client as speech are performed (block 502). Now assume a user 110 depicted in FIG. 1 would like to transfer a file using hand held computing device such as personal digital assistant (PDA) 102(3) depicted in FIG. 1. The file may be any computer readable file such as a presentation, a text document, an audio recording, or so forth. In this case, the user would like to share a file "file.txt" with one or more associates. The file may be physically located on the PDA 102(3) or accessible in remote storage to user 110, via network 104, a peer-to-peer network and so on. In this example, the user 10 may use voice to initiate transferring the file from the PDA 102(3), or from a remote location, to another location such as to network storage which accessible to the one or more associates. User 110 uses PDA 102(3) to communicate speech 112 to a service 106(s), over the network 104. For example, user 110 may speak a command or phrase such as "Transfer, file.txt", which is received by the PDA as speech 112. Operations specified by speech 112 are communicated to the service 106(s). In an implementation, speech 112 is communicated as voice data. The speech 112 may be translated into instructions understandable by an operations module 114(s), which may then perform the specified operations. For instance, translation module 118(s) may translate speech 112 from speech to text instructions. Alternatively, a client 102 such as the PDA 102(3) may be configured to convert voice data to text for communication to service 106(s). A translation module 116(n) included on the PDA 102(3) performs the translation of speech 112 from speech to text and the textual instructions are then sent to the service 106(s).

The service 106(s) performs the operations specified by the speech 112. For instance, operation module 114(s) may be executed to transfer the file "file.txt" between the PDA 102(3) and a network storage location. In this manner, the user 110 may move the file to a location where others (e.g., the one or more associates) may access the file. Of course, a file may also be transferred in another direction, e.g., from a service 102(s) or other network storage to the PDA 102(3).

A response is formed for communication to the client which includes the results of the operation (block 504). In the above example, the results may indicate whether the transfer of the file was successful. For instance, an audible response 116(p) may be formed which says "Completed". The response 116(p) may also be a text message, HTML message and so forth, which provides a listing of the files in the transfer location. A combination of responses 116(p) may also be formed, such as an instant message confirming the transfer, along with an audible response such as "Successful". A translation module 118(s) may be executed to provide real-time speech responses to PDA 102(3).

Naturally, the procedure may be used to perform a variety of other operations, such as to retrieve a file, send messages, access accounts, purchase items, email a file to one or more recipients, initiate executable instructions on a remote computing device, and so on.

Figure 6:
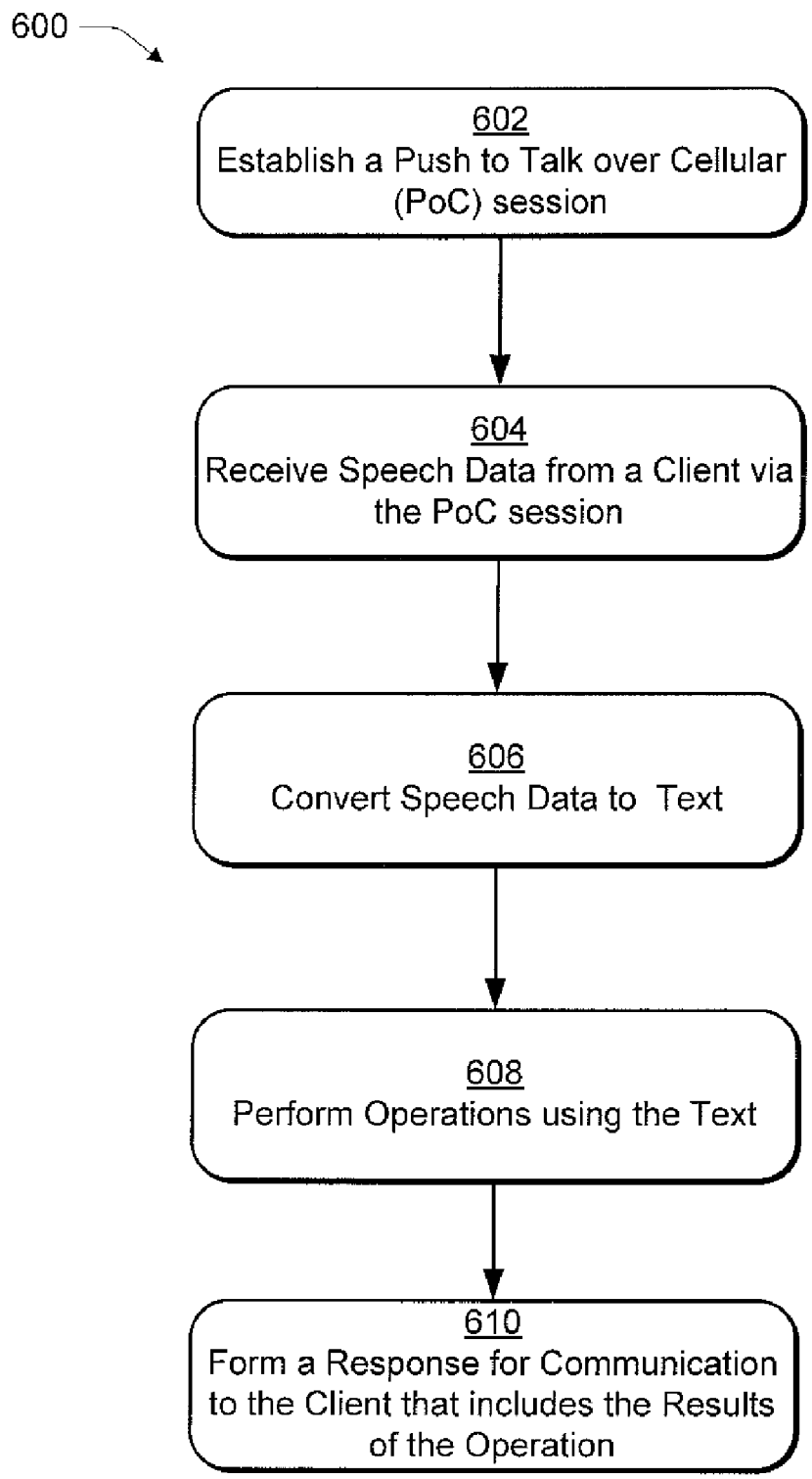
FIG. 6 is a flow diagram depicting a procedure in an exemplary implementation in which a push to talk over cellular (PoC) session is utilized for voice initiated operations.

FIG. 6 depicts an exemplary procedure 600 in which push-to-talk over cellular (PoC) is used to performed voice initiated operations. A push-to-talk over cellular (PoC) session is established (block 602). For instance, a client device 102(n) depicted in FIG. 2) may be configured as a PoC enabled mobile phone. The mobile phone client 102(n) may maintain a list of PoC contacts. One or more services 106(s) may be PoC contacts. Assume that user 110 desires content from a service 106(s). Service 106(s) may be configured to provide a variety of content such as audio, video, web pages and so on via network 104. In this case user 110 seeks audio content from service 106(s). The user selects a PoC contact and initiates the PoC session. For example, user may select service 106(s) from the contacts and hit a PoC button to initiate a session. A PoC session is established between mobile phone client 102(n) and service 106(s). Service 106(s) may immediately "hear" speech from mobile phone client 102(n) via the PoC session.

Speech data is received from the client via the PoC session (block 604). For example user 110 of FIG. 2 provides speech 112 to the mobile phone client 102(n), which is instantly (or near instantly) heard at the service 106(s) via the PoC session. Speech 112 may be a request for the desired audio content. For instance, user speech 112 may include a song title, an artist, a play-list, a location and so forth.

The speech data is converted to text (block 606). Continuing the previous example, the request for desired audio content may not be immediately understandable by the service 106(s), and in particular by the operations module 114(a) which will initiate the desired operations. Accordingly, the request may be converted from speech to text, e.g. to instructions understandable by the operation module 114(a). As depicted in FIG. 2, translation module 118(a) may be executed on a processor 204(a) of service 106(s) to convert the received speech 112 into text. In this example, text may be generated which provides instructions to initiate retrieving audio content specified in speech 112.

Operations are performed using the text (block 608). For instance, the text (e.g. the instructions) generated by the translation module 118(a) may be provided to the operation module 114(a) which uses the text to perform operations, in this case retrieving audio content. The desired audio content may be retrieved from a variety of locations including from the server 202(a), from one of the plurality of servers 202 of service 106(s), or from another service 106 or remote location accessible via network 104.

A response is formed including the results of the operations for communication to the client (block 610). For example, a response 116(p) configured as an HTML document may be formed which provides a hyperlink to the selected audio content. Upon receiving the response 116(p), user 110 may use the hyperlink to access the content. The content may be provided in streaming or non-streaming manner. The response 116(p) may also include returning the desired content itself. For instance the response 116(p) may provide an audio file to mobile phone client 102(n) in a non-streaming manner, alone or along with a graphical response such as an instant messaging, an email and so on.

In an implementation, the established PoC session may be used to communicate an audible response to the client. For instance, an audible response may indicate that the desired content is available or unavailable, that a graphical response was sent, a location where content is available, and so on. Thus, a response module 218 of FIG. 2 may be used to form a response 116(p). The response may be translated from text to speech via translation module 118(a). The results of the translation may be sent in real time to mobile phone client 102(n) via the PoC session. In another implementation, the desired audio content may be streamed to the client via the PoC session or another PoC session. An audible response via PoC may be in addition to or in lieu of the other modes of response. For instance, instant messages, HTML, text, e-mail, and audible responses may be formed in various combinations as previously described.

Figure 7:
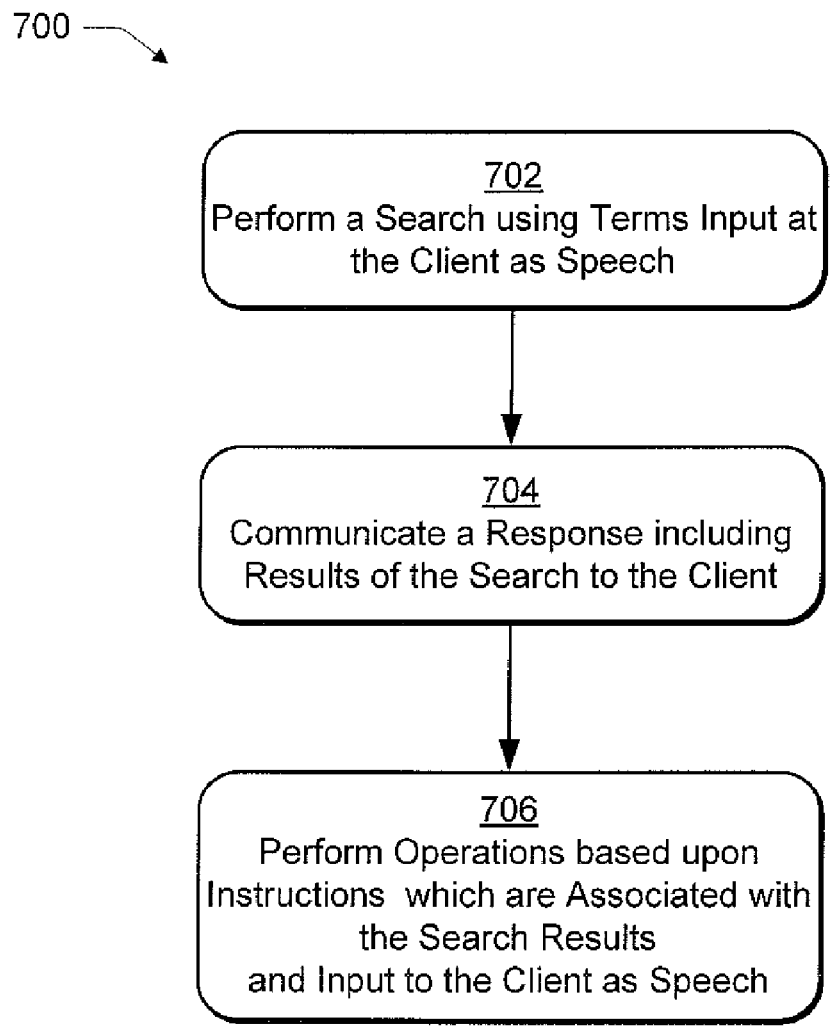
FIG. 7 is a flow diagram depicting a procedure in an exemplary implementation in which the results of a voice initiated search are leveraged for additional voice initiated operations.

FIG. 7 depicts a procedure 700 in which voice initiated search results are leveraged to perform additional voice initiated operations. A search is performed using terms input at a client as speech (block 702). For example, the user 110 may wish to make a reservation, such as for an airline flight. User 110 may use one of client devices 102(n) depicted in FIG. 1 to communicate with a service 106(s) configured to provide reservation via network 104. User 110 may provide speech 112 to initiate a search for available flights. For instance, if the user wishes to find flights between Portland, Oregon and Chicago, Illinois on April 1, user 110 may provide speech 112 with search terms such as "Flights, PDX to ORD, April 1st." A search engine 216 may be executed on service 106(s) to perform the search specified by the speech 112. Search engine 216 may be provided with textual search terms generated from a translation of speech 112 by a translation module 118(a). Although translation module 118(a) is depicted on the same server as search engine 216, translation may also be performed on a different server 202, by a translation module 118 of a client 102, and so forth.

Results of the search are communicated to a client (block 704). In response to the flight search example above, the user 110 may receive a response 116(p) which includes a list of five flights between Portland, Oreg. and Chicago, Ill. on April 1. The response may be formatted in any of the variety of ways previously described, such as an HTML document, instant message, e-mail and so on.

Additional operations are performed based upon instructions which are associated with the search results and input to the client as speech (block 706). The user 110 of the previous example receives and views the results of the search, which include five possible flights for example. The user 110 may now wish to reserve one of the flights. Thus, user may provide additional speech 112 related to the search results. For instance, the additional user speech 112 may indicate "Reserve Flight 99" which corresponds to one of the flights listed in the search results. In an implementation, the user may also be prompted on how to initiate further operations using the search results. For instance item 1 in the search results may indicate "To reserve this flight say: Reserve 1". Operations specified by the additional speech 112 are communicated to a service 102(s). The service may be the same service 102(s) that performed the search, or a different service 102. The service then performs the additional operations related to the search results previously provided.

Thus, the results of a search initiated by speech may be leveraged to perform additional operations initiated by speech. Naturally, leveraging speech initiated search results may be used to perform a variety of operations such as, file transfers, file retrieval, purchasing transactions, a travel reservation, hotel and restaurant reservations, and so forth. The additional operations may also be a further search or refinement of search results.

CONCLUSION

Although the invention been described in language specific to structural features and/or methodlogical acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
receiving, at a service of a plurality of services, a request to initiate a push to talk over cellular (PoC) session via a network, wherein the request is based at least in part on a user selection of the service;
receiving a voice command including voice data at the service via the PoC session, wherein each service of the plurality of services is implemented on a respective server that includes a respective translation module;
translating the voice data to instructions understandable to an operations module of the service;
performing, by the operations module, the translated instructions to form a graphical response; and
forming a communication that includes the graphical response to be communicated to a client device of the user over the network.

2. The method of claim 1, wherein the graphical response is an email.

3. The method of claim 1, wherein the graphical response is a hypertext markup language (HTML) document.

4. The method of claim 1, wherein the graphical response is an instant message.

5. The method of claim 1, wherein the voice command is received from a handheld client device.

6. The method of claim 1, wherein the voice command specifies at least one operation to be performed selected from the group consisting of:
a search;
a financial transaction;
a purchasing transaction;
a file transfer;
a reservation; and
a download.

7. A method comprising:
receiving, at a service of a plurality of services, a request to initiate a push to talk over cellular (PoC) session via a network, wherein the request is based at least in part on a user selection of the service;
receiving a voice command including voice data at the service via the PoC session, wherein each service of the plurality of services is implemented on a respective server that includes a respective translation module;
translating the voice data to a search term understandable to an operations module of the service;
performing, by a search engine of the operations module, a search specified by the search term; and
forming a response that includes search results to be communicated over the network to a client that originated the voice data, wherein the search results are automatically refined based upon a location of the client.

8. The method of claim 7, wherein the search term is understandable by the search engine and the voice data is not understandable by the search engine.

9. The method of claim 7, wherein the response includes one or more items selected from the group consisting of:
an email;
text;
an html document;
an instant message;
an image; and
audible sound.

10. The method of claim 7 further comprising converting the search results from text to an audible response.

11. The method of claim 7, wherein the response is a real-time audible response.

12. The method of claim 7, further comprising performing an operation based upon additional voice data which is associated with the search results and input to a client device of the user as speech.

* * * * *

UNITED STATES PATENT AND TRADEMARK OFFICE
CERTIFICATE OF CORRECTION

| | | |
|---|---|---|
| PATENT NO. | : 7,996,228 B2 | Page 1 of 1 |
| APPLICATION NO. | : 11/275324 | |
| DATED | : August 9, 2011 | |
| INVENTOR(S) | : Quentin Miller et al. | |

It is certified that error appears in the above-identified patent and that said Letters Patent is hereby corrected as shown below:

In column 13, line 50, after "invention" insert -- has --.

Signed and Sealed this
Twenty-fifth Day of October, 2011

David J. Kappos
*Director of the United States Patent and Trademark Office*